No. 643,034. Patented Feb. 6, 1900.
H. BARTELS & L. BERNHARD.
COTTON CHOPPER.
(Application filed June 28, 1899.)
(No Model.)
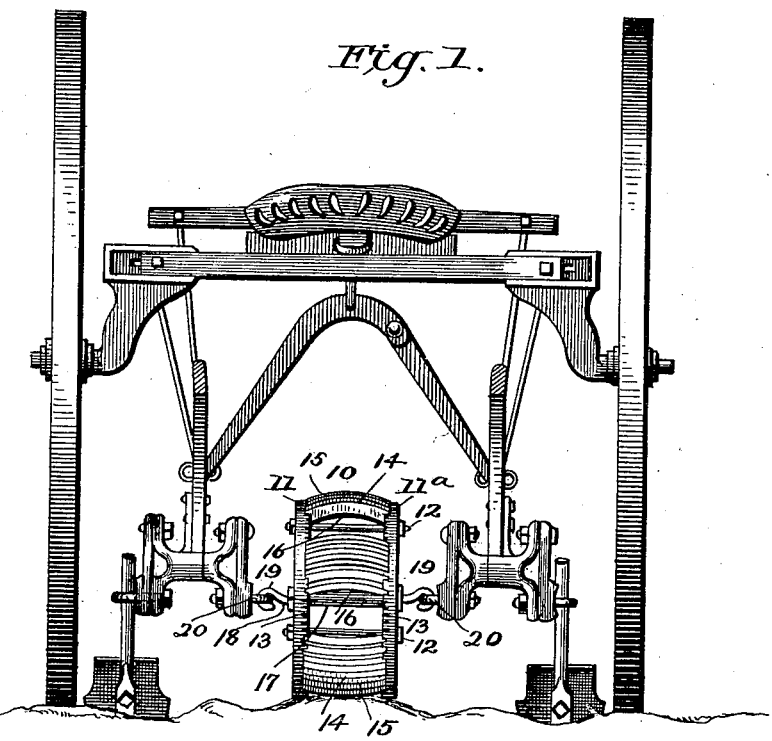
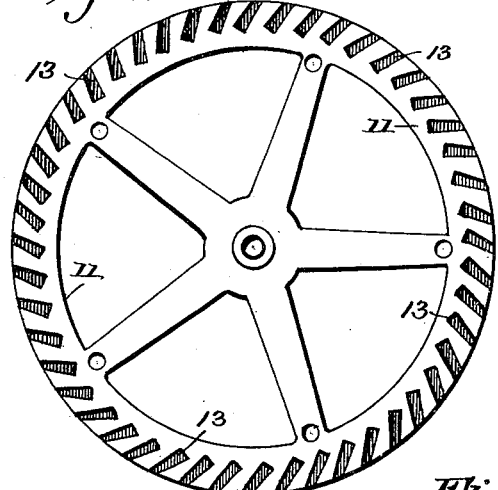
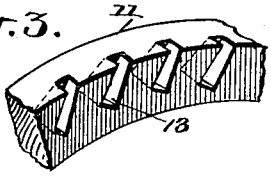
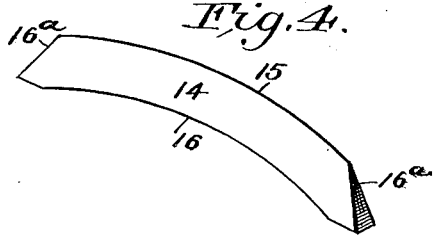
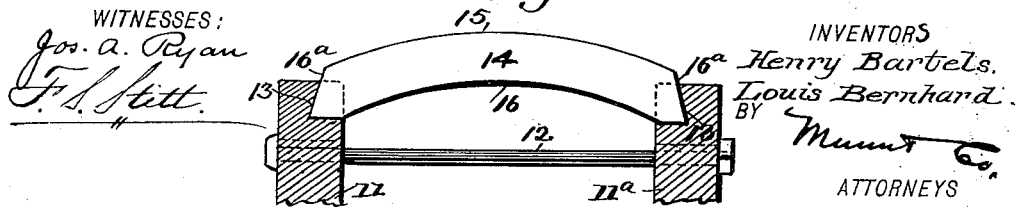
WITNESSES:
Jos. A. Ryan
F. L. Stitt
INVENTORS
Henry Bartels.
Louis Bernhard.
BY
Munn & Co.
ATTORNEYS

UNITED STATES PATENT OFFICE.

HENRY BARTELS AND LOUIS BERNHARD, OF NEW BRAUNFELS, TEXAS.

COTTON-CHOPPER.

SPECIFICATION forming part of Letters Patent No. 643,034, dated February 6, 1900.

Application filed June 28, 1899. Serial No. 722,211. (No model.)

*To all whom it may concern:*

Be it known that we, HENRY BARTELS and LOUIS BERNHARD, of New Braunfels, in the county of Comal and State of Texas, have invented a new and useful Improvement in Cotton-Choppers, of which the following is a specification.

Our invention is an improvement in cotton-choppers, and has for its object a device of this character which can be easily attached to a cotton-cultivator and in which the chopping-knives can be easily secured at any portion of its periphery, so that adequate spaces may be left between sets of knives for the purpose of passing over the stalks at desired intervals.

The invention consists in certain details of construction and arrangement of the parts, which will hereinafter be described and claimed.

Reference is to be had to the accompanying drawings, forming part of this specification, in which like characters of reference indicate corresponding parts in all the views.

Figure 1 is a rear elevation of our improved cotton-chopper as applied for use. Fig. 2 is a side view of one of the disks detached. Fig. 3 is a detail perspective of part of one of the disks. Fig. 4 is a perspective view of one of the knives detached. Fig. 5 is a detail cross-section.

Our cotton-chopper is in the form of a wheel 10, consisting of two disks 11 and 11ª, connected together by a suitable number of tie-bolts 12 and formed all around their inner opposing faces with a series of undercut peripheral recesses 13, which, as best seen in Fig. 3, are deeper and wider at their bottom and taper toward the peripheries of the disks. In the recesses 13 are received knives 14, which are formed with convex cutting edges 15 and concave rear edges 16, and the said knives correspond in cross-section to the cross-section of the recesses and have upwardly-beveled ends 16ª, so that they may slip endwise in the recesses and be prevented from coming out when the two disks are tightened endwise against the knives.

The knives 14, as shown, are arranged in spaced-apart sets, so that certain stalks may be left standing when thinning the cotton, the size of the spaces being determined by the distance desired between such stalks.

The wheel 10 is provided with a hollow hub 17, in which is mounted the spindle 18, whose ends are formed with hooks 19, adapted to engage eyebolts 20 on the clips which are for securing the cultivator-shovels in place, as shown in Fig. 1. By the arrangement described the chopping-wheel 10 will effectively do its work as it is advanced by the cultivator.

Having thus described our invention, what we claim as new, and desire to secure by Letters Patent, is—

1. A cotton-chopper comprising a wheel formed of connected disks, said disks being formed in their adjacent and inner faces with series of recesses undercut toward their opposite and outer faces, and chopping-knives having their ends fitted in said recesses, as set forth.

2. A cotton-chopper, comprising a wheel formed of two opposing disks whose inner faces are provided with series of undercut peripheral recesses deeper and wider at their bottoms and tapering toward the peripheries of the disks, cutting-knives corresponding in cross-section to the recesses and having upwardly-beveled ends adapted to be received in said recesses, tie-bolts connecting said disks, and a spindle on which said wheel is mounted to turn, said spindle having its ends arranged for attachment to a cultivator-frame, as set forth.

3. A cotton-chopper, comprising a wheel formed with peripheral undercut recesses and chopping-knives detachably held in said recesses, said knives being formed with convex cutting edges, as set forth.

4. A cotton-chopper, comprising a wheel carrying chopping-knives; and a spindle on which said wheel is mounted to turn, said spindle being provided with hooks at its ends whereby it may be hung in a cultivator-frame, as set forth.

HENRY BARTELS.
LOUIS BERNHARD.

Witnesses:
C. F. H. FISCHER,
G. BEHNSOP.